John Lemman
Machine for Molding Chairbacks &c.

113898              Patented Apr 18 1871

Attest
Henry Millward
Elisha H. Layman

Inventor
John Lemman
By F. Millward
Attorney

United States Patent Office.

JOHN LEMMAN, OF CINCINNATI, OHIO.

Letters Patent No. 113,898, dated April 18, 1871.

IMPROVEMENT IN MACHINES FOR MOLDING CHAIR-BACKS.

The Schedule referred to in these Letters Patent and making part of the same.

To all whom it may concern:

Be it known that I, JOHN LEMMAN, of Cincinnati, Hamilton county, State of Ohio, have invented a certain new and useful Improvement in Machines for Molding Chair-Backs; and I hereby declare the following to be a sufficiently full, clear, and exact description thereof to enable one skilled in the art to which my invention appertains to make and use it, reference being had to the accompanying drawing making part of this specification.

Nature and Objects of Invention.

My invention relates to an improvement upon the machine patented by me August 17, 1869, and consists of a certain peculiar arrangement of the parts, by which the cutter-spindle runs in stationary bearings, and the work and "form" are adapted to swivel, swing, and slide in the operation of cutting the chair-back or other work to the prescribed shape, the object of this improvement upon the machine patented as aforesaid being to avoid the use of a swiveling driving-pulley, which is necessarily employed in my former machine, and is under many circumstances objectionable.

Description of the Accompanying Drawing.

Figure 1:
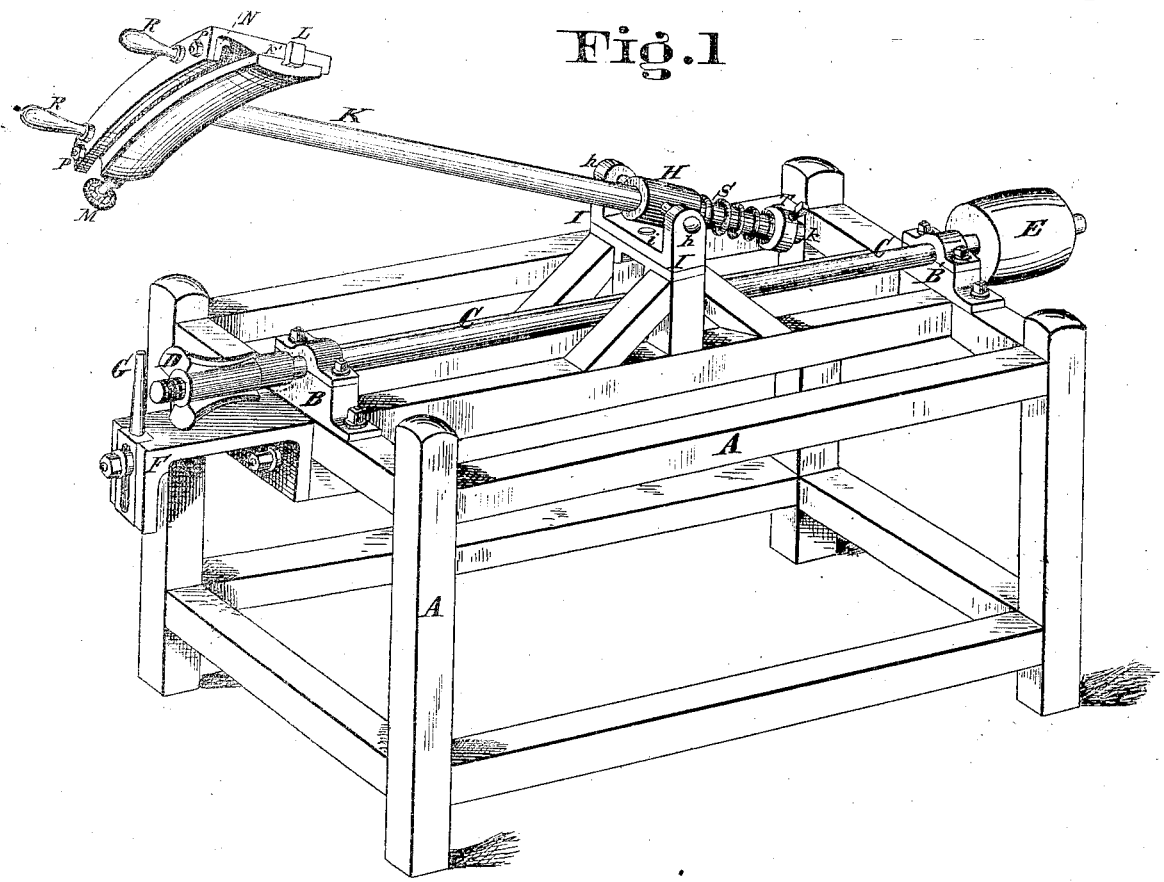
Figure 1 is a perspective view of a machine embodying my invention.
Figure 2:
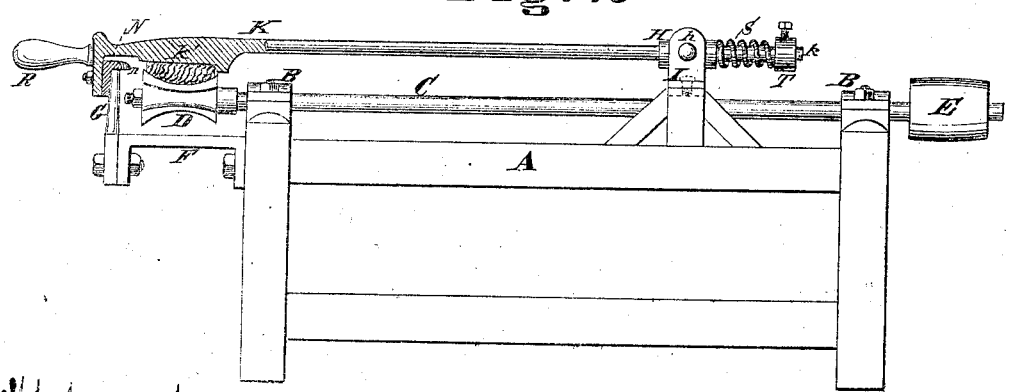
Figure 2 is a side elevation of the same partly in section.

General Description.

A is the frame of the machine, in the bearings B B' of which the cutter-spindle C is journaled.

D is the cutter, shaped in such a manner as to enable it to cut in either direction of rotation, and E is the driving-pulley of the same.

The frame also supports upon the bracket F an adjustable guiding-finger, G, on which the form rests and slides.

A "universal joint," consisting of socket H, pivoted at $h\ h'$ to swivel in a vertical plane, and jaw I, pivoted at $i$ to swivel in a horizontal plane, is connected to the frame A in the manner shown.

Through the socket H the shank $k$ of the arm K is fitted to slide and rotate.

The outer end of the arm is constructed with a broad surface, $k'$, to receive the chair-back or other work to be shaped, the latter being firmly secured in place by the jaw L and tightening-screw M.

The arm is also fitted with the form or template N for giving direction to the work over the cutter.

This form N is adjustable in the arm by means of nuts P and slotted holes for the bolts, or any other adjusting device.

The arm is operated by the handles R in such a way that the work is passed over the cutter in such a direction as to cut "with the grain" of the wood half-way across the work; then, by reversing the cutter by suitable belting, the arm may be moved to cut the other half of the work with the grain of the wood.

In the operation of the machine the flange $n$ of the form N rests upon the pintle or guide-finger G, and is pressed laterally against the finger by means of the coiled spring S between the socket H and a collar, T, upon the shank $k$. The elasticity of this spring enables the finger to follow the irregular form N.

In order to fix the work in the arm previous to cutting, the arm may be turned in the socket H bottom side up, so that the work can be conveniently laid upon it and firmly secured.

I claim—

The combination of the stationary guiding-finger G, cutter-spindle C D E revolving in stationary bearings, and the swiveling and sliding arm K $k$ carrying the "form" and "work," substantially as and for the purpose set forth.

In testimony of which invention I hereunto set my hand.

JOHN LEMMAN.

Witnesses:
FRANK MILLWARD,
J. L. WARTMANN.